United States Patent [19]

Fee et al.

[11] Patent Number: 5,666,861
[45] Date of Patent: Sep. 16, 1997

[54] ARMREST ADJUSTING MECHANISM

[75] Inventors: David M. Fee, Groveland; Stephen A. Haytcher, Peoria; John P. Mackoway, Washington, all of Ill.

[73] Assignee: Caterpillar Inc., Peoria, Ill.

[21] Appl. No.: 524,594

[22] Filed: Sep. 7, 1995

[51] Int. Cl.$^6$ .............................. B60K 20/02; B60N 2/46
[52] U.S. Cl. ................ 74/523; 297/411.35; 297/411.36; 384/38; 384/57
[58] Field of Search .................... 248/118, 287.1; 297/411.2, 411.35, 411.36; 180/326, 333; 74/523, 471 XY; 384/38, 57

[56] References Cited

U.S. PATENT DOCUMENTS

| | | | |
|---|---|---|---|
| 4,200,166 | 4/1980 | Hansen | 74/523 X |
| 4,478,308 | 10/1984 | Klaassen | 180/326 |
| 4,637,738 | 1/1987 | Barkley | 384/38 |
| 4,702,520 | 10/1987 | Whisler et al. | 297/411.36 |
| 5,033,869 | 7/1991 | Kingston et al. | 384/38 |
| 5,244,066 | 9/1993 | Mackoway et al. | 74/523 X |
| 5,388,913 | 2/1995 | Cawley et al. | 384/38 |

*Primary Examiner*—Charles A. Marmor
*Assistant Examiner*—Troy Grabow
*Attorney, Agent, or Firm*—Robert J. Hampsch; Dennis C. Skarvan

[57] ABSTRACT

An armrest adjusting mechanism is disclosed which includes a base plate mountable to an article of construction machinery and a first working plate movable relative to the base plate. First and second shafts are mounted to the first working plate. The first shaft is guided by first and second spherical bearings fixedly mounted to the base plate. The second shaft is guided by a third spherical bearing adjustably mounted to the base plate. The third spherical bearing is attached to a third shaft which is disposed normal to the first and second shafts. A cylindrical bearing guides the third shaft as it moves in response to misalignment between the first and second shafts. In a similar manner, fourth and fifth shafts are mounted to the first working plate. The fourth shaft is guided by fourth and fifth spherical bearings fixedly mounted to a second working plate. The fifth shaft is guided by a sixth spherical bearing adjustably mounted to the second working plate. The sixth spherical bearing is attached to a sixth shaft which is disposed normal to the fourth and fifth shafts. A second cylindrical bearing guides the sixth shaft as it moves in response to misalignment between the fourth and fifth shafts.

4 Claims, 7 Drawing Sheets

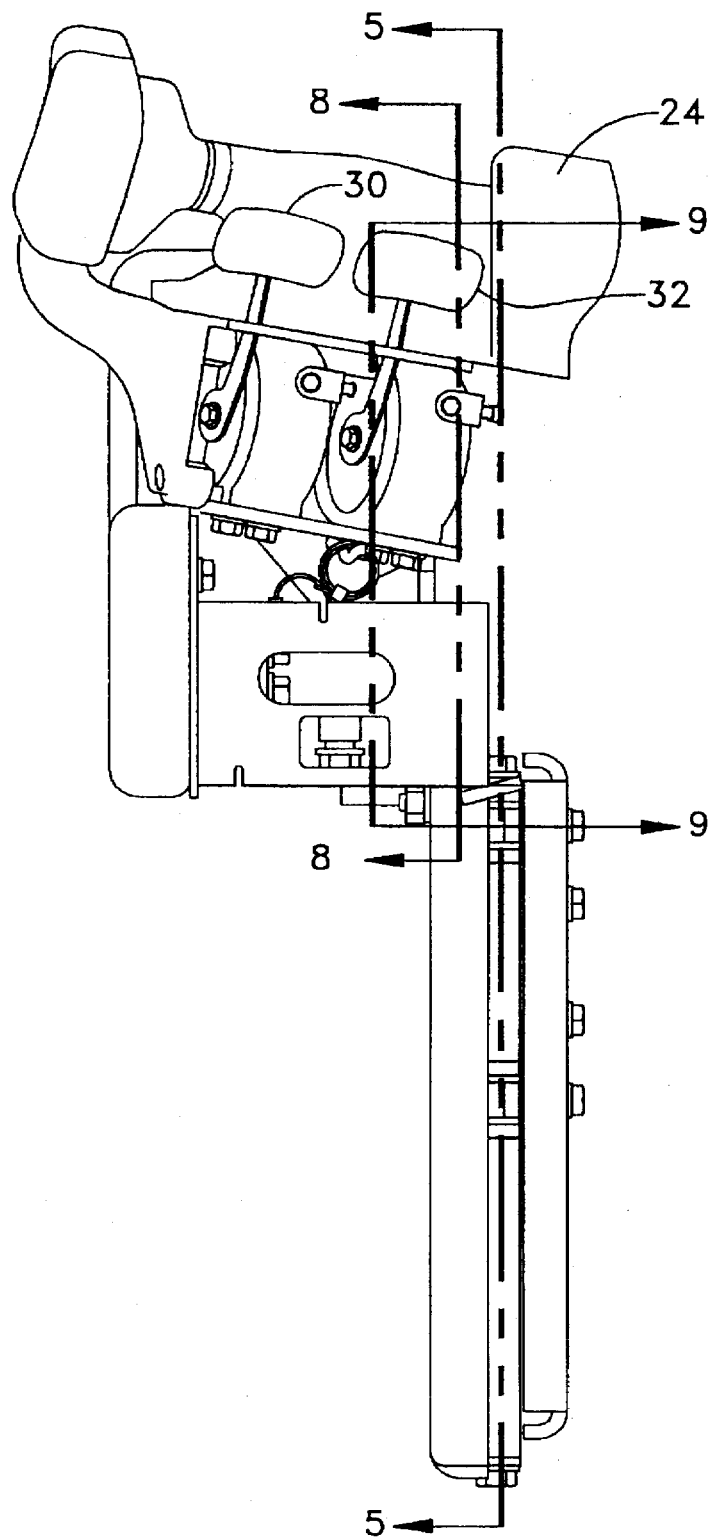

Fig_3
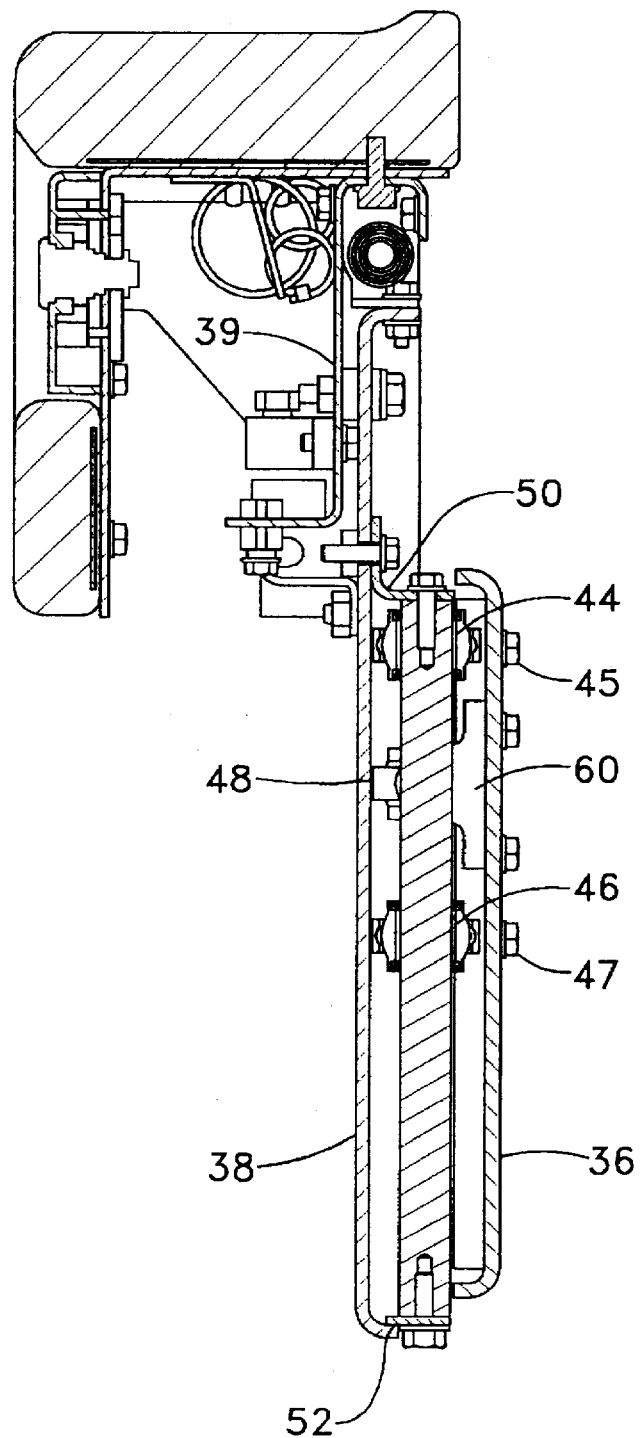

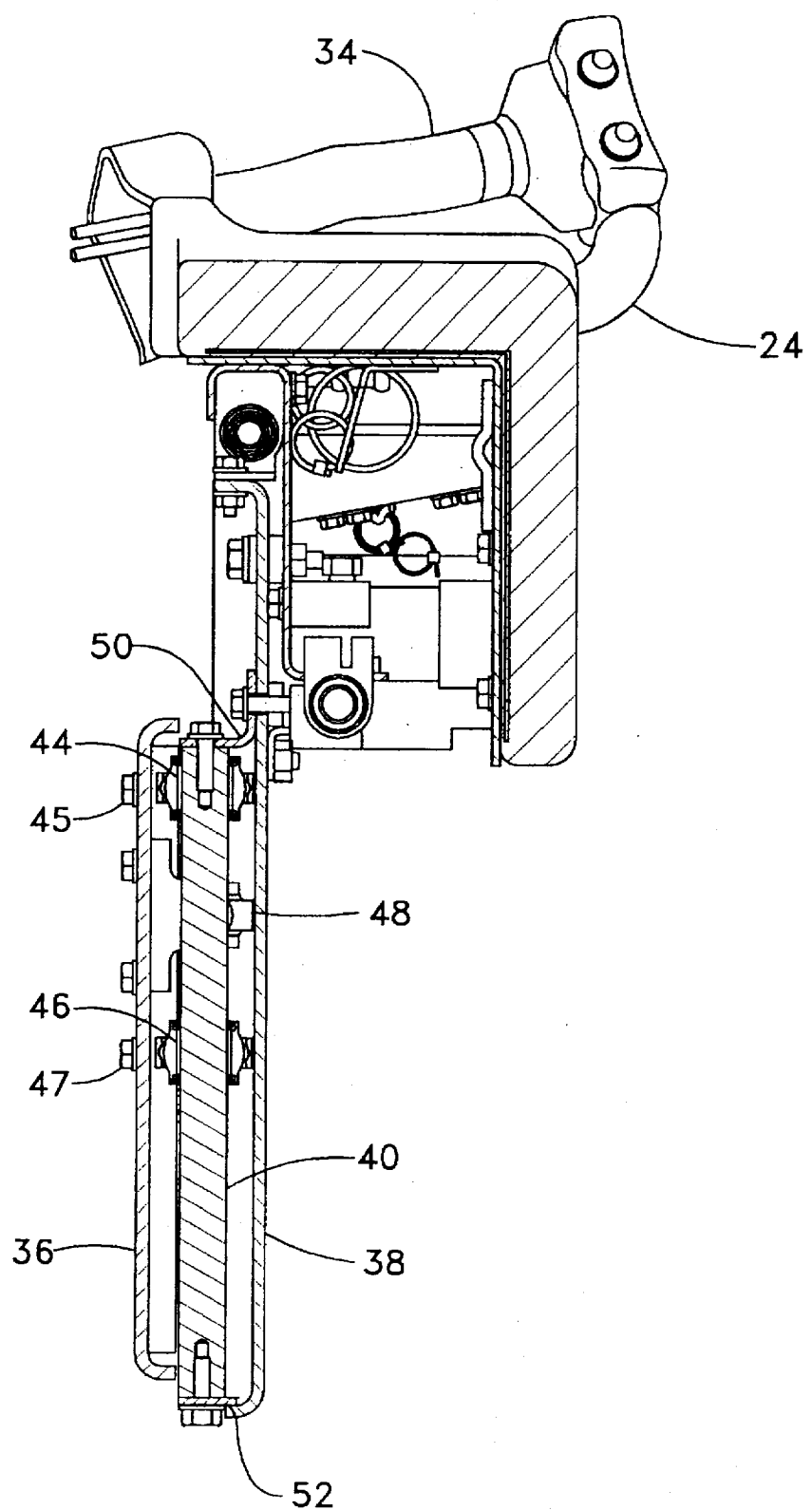

Fig_5_
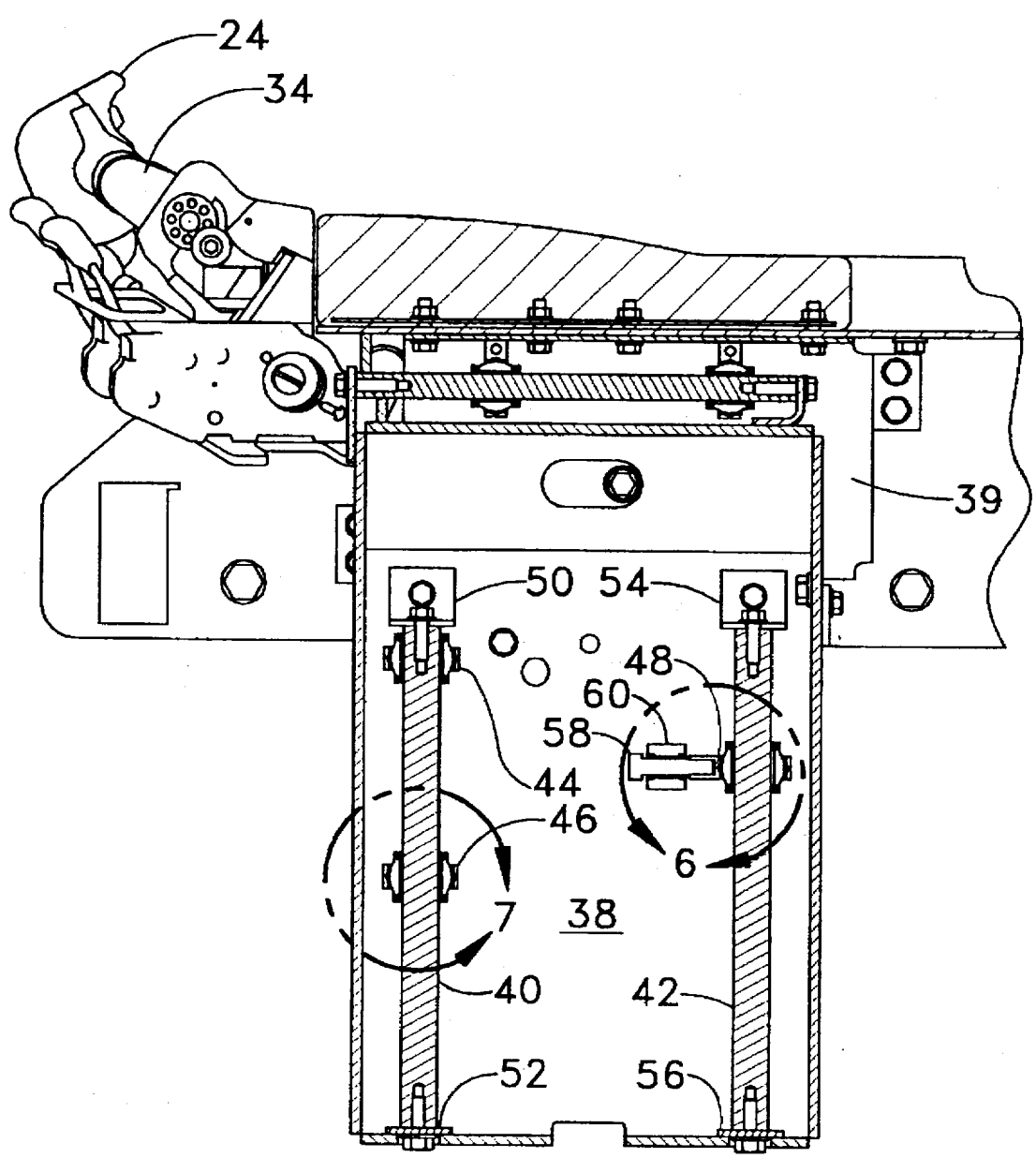

Fig_6_
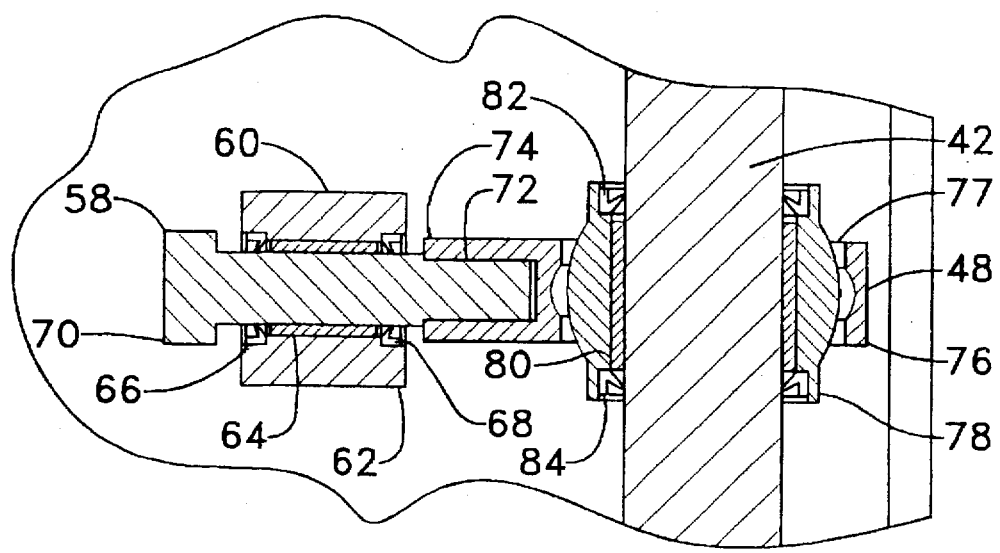
Fig_7_
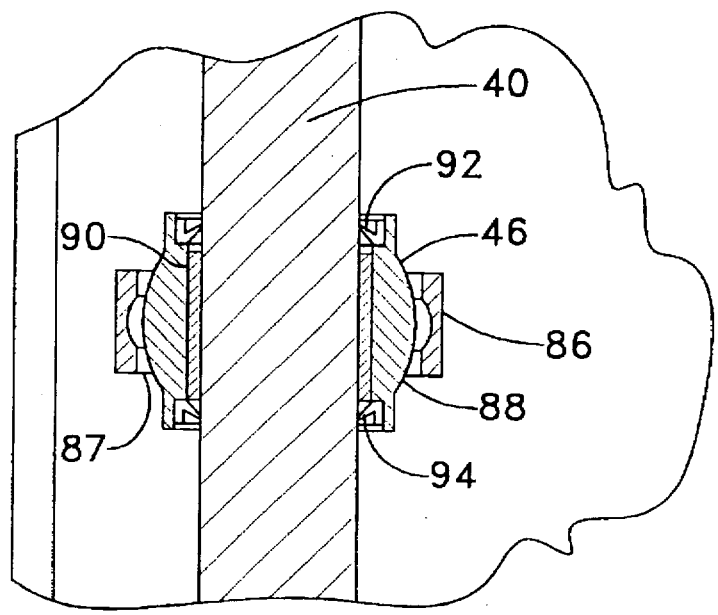

ARMREST ADJUSTING MECHANISM

TECHNICAL FIELD

This invention relates generally to sliding mechanisms for translating motion and, more particularly, to a rectilinear sliding mechanism that can accommodate misalignment either within or external of the mechanism.

BACKGROUND ART

Various adjusting mechanisms have been developed for use with arm rests and seat adjusters in the operator cab of construction equipment. For example, it is desirable to have an arm rest adjuster to facilitate proper positioning of an operator's arm in order to operate the control console of the construction equipment. See, for example, the arm rest and control console disclosed in U.S. Pat. No. 5,244,066 to Mackoway et al., filed on Oct. 16, 1992 and issuing on Sep. 14, 1993, the contents of which are hereby incorporated by reference. Because of the oftentimes harsh environment associated with the construction equipment and because of manufacturing variances, it is desirable that the adjusting mechanism be tolerant of misalignment while still providing a smooth and rattle-free adjustment. The present invention is directed to providing an adjusting mechanism which is tolerant of misalignment and which is adaptable for use with various operator adjusters of construction equipment.

DISCLOSURE OF THE INVENTION

According to one embodiment of the present invention, an apparatus for use in translating motion between a base member and a working member is disclosed, comprising a base member, a first working member adapted for translation relative to the base member, a first linear member attached to one of the base member or the first working member, a second linear member attached to the one of the base member or the first working member, the second linear member being disposed generally parallel to the first linear member, a first bearing member attached to the other of the base member or the first working member, the first bearing member slidingly receiving the first linear member therethrough, a second bearing member attached to the other of the base member or the first working member, the second bearing member slidingly receiving the first linear member therethrough, a third bearing member attached to the other of the base member or the first working member, a third linear member slidingly received through the third bearing member; and a fourth bearing member attached to the third linear member, the fourth bearing member slidingly receiving the second linear member therethrough.

According to another embodiment of the present invention, an operator controlled adjustment apparatus for use in construction machinery is disclosed, comprising a first support member, a second support member, a third support member, first and second shafts guidedly attached to the second support member for guided movement relative to the first support member in a first direction, a first bearing attached to the first support member, a third shaft guidedly received through the first bearing for movement in a second direction, a second bearing attached to the third shaft, the second bearing guidedly receiving one of the first and second shafts therethrough, fourth and fifth shafts guidedly attached to the second support member for movement in the second direction, a third bearing attached to the third support member, a sixth shaft guidedly received through the third bearing for movement in a second direction, and a fourth bearing attached to the sixth shaft, the fourth bearing guidedly receiving one of the fourth and fifth shafts therethrough.

According to another embodiment of the present invention, a method for adjusting an operator controlled apparatus for use in construction machinery, comprising the steps of adjusting a first working member relative to a base member in a first direction, the working member being guided in the first direction by a first shaft disposed in the first direction and received through a first self-aligning bushing and a second shaft disposed in the first direction and received through a second self-aligning bushing, wherein the second self-aligning bushing adjusts in a second direction as the working member adjusts relative to the base member to accommodate misalignment between the first shaft and the second shaft.

Other aspects, objects, and advantages of this invention can be obtained from a study of the drawings, the disclosure, and the appended claims.

BRIEF DESCRIPTION OF THE DRAWINGS

FIG. 2 is a front elevational view of the arm rest of FIG. 1.

FIG. 3 is a cross-sectional view of the armrest taken in the direction of the arrows indicated along lines 3—3 of FIG. 1.

FIG. 4 is a cross-sectional view of the armrest taken in the direction of the arrows indicated along lines 4—4 of FIG. 1.

FIG. 5 is a cross-sectional view of the armrest taken in the direction of the arrows indicated along lines 5—5 of FIG. 2.

FIG. 6 is an exploded view of the circled portion 6 of FIG. 5.

FIG. 7 is an exploded view of the circled portion 7 of FIG. 5.

BEST MODE FOR CARRYING OUT THE INVENTION

Figure 1:
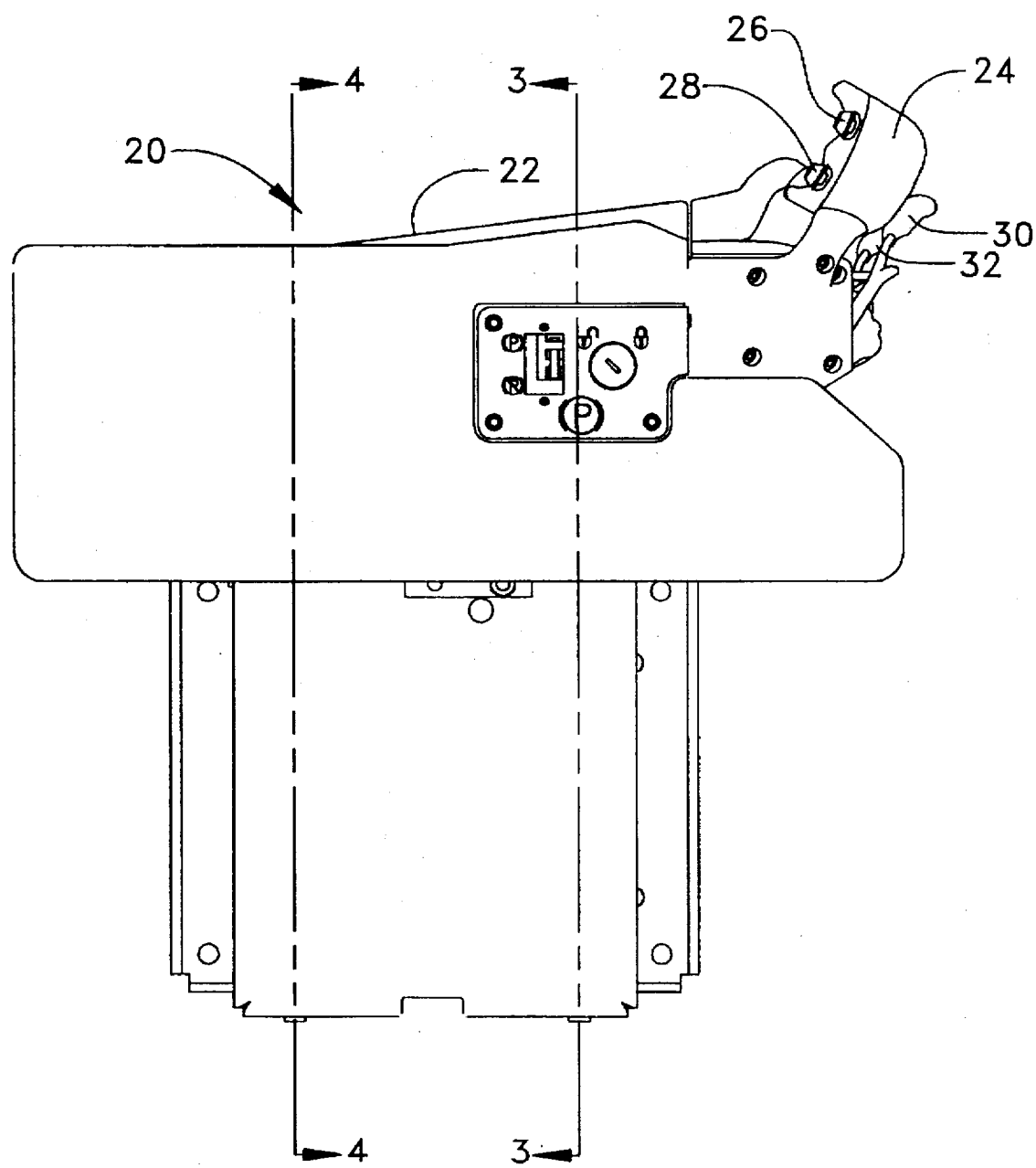
FIG. 1 is a right side elevational view of an armrest according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 and 2, a control mechanism 20 is shown including an armrest 22 and a hand rest 24. Control mechanism 20 functions similar to the control mechanism of U.S. Pat. No. 5,244,066 previously incorporated herein by reference. For example, electrical switches 26 and 28 control the ground speed of the construction machine and levers 30 and 32 control the steering of the construction machine. Similarly, shifting of the transmission of the construction machine is accomplished via control mechanism 20 by rotating grip portion 34 (FIG. 5).

Because the construction machine is controlled by the operator's arm, in particular the operator's hand resting on grip portion 34 and upper arm resting on armrest 22, it is desirable that armrest 22 be adjustable to best fit the operator's desired, comfortable arm position. In order to facilitate this adjustment, control mechanism 20 is adjustable upwardly and downwardly as well as fore and aft. As understood herein, vertical adjustment of control mechanism 20 corresponds to an upwardly or downwardly movement of mechanism 20 that raises or lowers the operator's arm; i.e., in a direction generally perpendicular to armrest 22. Similarly, horizontal or lateral adjustment of control mechanism 20 corresponds to a fore or aft movement of mechanism 20 that extends or retracts the operator's arm; i.e., in a direction generally along or parallel to armrest 22.

Referring now to FIGS. 3–5, control mechanism 20 is secured to the construction machine at fixed plate 36. Mounting plate 36 bolts to the framework of the operator cab to define the base member for mechanism 20. Working plate 38 or first working member translates relative to mounting plate 36 via conventional motive means such as an electric motor that drives plate 38. Alternately, manual adjustment by the operator can provide the motive means. For manual adjustment, a friction lock retains the control mechanism in the desired armrest position.

To facilitate the relative vertical motion between plates 36 and 38, linear cylindrical members 40 and 42 are received through and guided by spherical bushings 44, 46 and 48. First linear members 40 and second linear member 42 are disposed generally parallel relative to one another and are bolted to working plate 38 or working member at flanges 50,52 and 54,56 respectively. Spherical bushings 44 and 46 are bolted to base plate 36 at mounting locations 45 and 47 (FIGS. 3 and 5), while spherical bushing 48 or fourth bearing member is mounted vertically-fixed relative to base plate 36 as discussed further hereinafter. As a result, first linear member 40 translates vertically guided by first and second bearing members, e.g., spherical bushings 44 and 46. Similarly, second linear member 42 translates vertically guided by a fourth bearing member, illustrated as spherical bushing 48. The spherical function of the bushings 44 and 46 accommodates any non-linearity between first linear member 40 and the mounted location of the bushings 44,46. For example, if first linear member 40 and/or plate 36 is slightly curved, bushings 44 and 46 can rotate to accommodate the slight curvature. Similarly, if the bushings 44,46 are mounted slightly off-axis relative to first linear member 40 so as not to be coaxial with member 40, bushings 44 and 46 can rotate to accommodate the mounting offset.

Referring now to FIGS. 4 and 5, spherical bushing 48 further rotates to accommodate any non-parallelism between first and second linear members 40 and 42. Unlike bushings 44 and 46, however, spherical bushing 48 is not mounted to plate 36, but instead is mounted to a third cylindrical linear member 58 which is fixed in a vertical direction relative to plate 36, but is free to translate in a horizontal direction relative to plate 36. In the specific preferred embodiment, a third bearing member, (i.e., cylindrical bushing 60) is mounted to plate 36 and receives and guides third linear member 58 therethrough. As a result, third linear member 58 and spherical bushing 48 translate in a horizontal direction to accommodate any spacing deviations between the first and second linear members 40 and 42. For example, if second linear member 42 is mounted parallel to first linear member 40 but at a spacing too near to first linear member 40, spherical bushing 48 and third linear member 58 translate toward first linear member 40 to accommodate the spacing variance.

Referring now to, FIGS. 6 and 7, the construction of the primary bearing members, namely spherical bushings 44, 46 therefor 48 and of cylindrical bushing 60 are shown in greater detail. In FIG. 6, the third bearing member is a cylindrical bushing 60 which includes a housing 62 and a linear bearing 64 contained within the housing 62. Lip seals 66 and 68 are disposed at either side of bearing 64 to prevent dirt or other debris from entering the bearing region defined generally by linear bearing 64. Third linear member 58 is a shouldered bolt defining a shoulder 70 at an end thereof and a threaded portion 72 fastened to the third bearing member or spherical bushing 48. Shoulder 70 operated as a stop to limit the range of motion of third linear member 58.

The first, second and fourth bearing members are illustrated as spherical bushings 44, 46 and 48. Spherical bushings 46 and 48 are similar in construction to bushing 60 in that each includes a housing and a linear bearing contained within the housing. In FIG. 6, spherical bearing 48 includes a housing 76 which defines a threaded end 74 adapted for mounting to third linear member 58. End 74 also operates as a stop to limit the range of motion of third linear member 58. Housing 76 includes a spherical member 78 which contains a linear bearing 80 therein. Spherical member 78 is assembled in housing 76 by injection molding a plastic such as glass-filled nylon into cavity 77, thereby creating a tight spherical rotational interface between member 78 and housing 76. Similar to cylindrical bushing 60, lip seals 82 and 84 are disposed at either side of spherical member 78 to prevent dirt or other debris from entering the bearing region defined generally by linear bearing 80.

In FIG. 7, the construction of spherical bushing 46 is shown in greater detail. Because bushing 46 is similar in construction to bushing 44, only the description of bushing 46 is described herein with the understanding that bushing 44 is of like construction. Bushing 46 includes a housing 86 and spherical member 88 which contains a linear bearing 90 therein. Spherical member 88 is assembled in housing 86 by injecting molding plastic into cavity 87, thereby creating a tight spherical rotational interface between member 88 and housing 86. Lip seals 92 and 94 are disposed at either side of spherical member 78 to prevent dirt or other debris from entering the bearing region defined generally by linear bearing 90.

Figure 8:
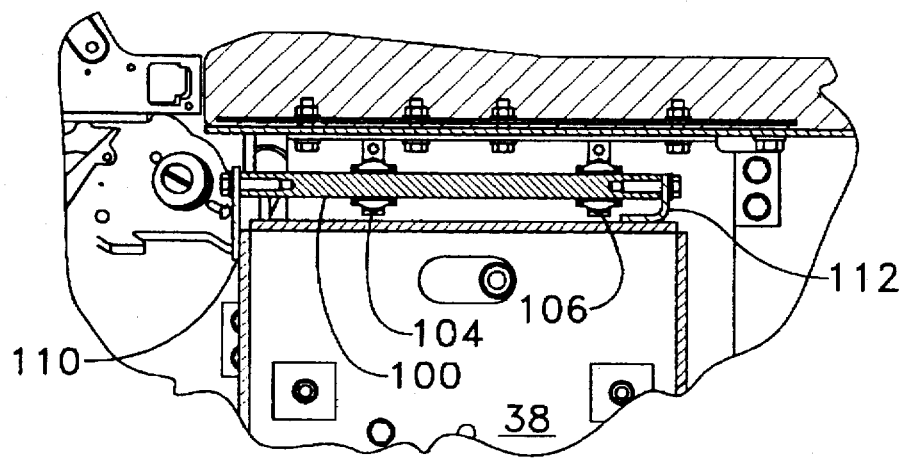
FIG. 8 is a partial, cross-sectional view of the armrest taken in the direction of the arrows indicated along lines 8—8 of FIG. 2.
Figure 9:
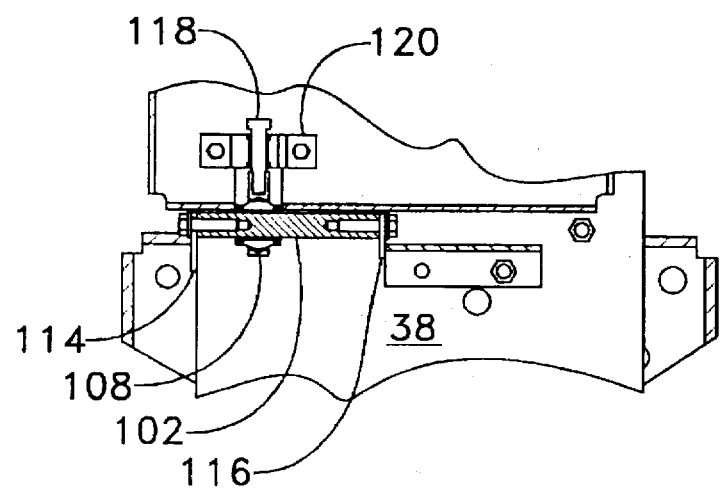
FIG. 9 is a partial, cross-sectional view of the armrest taken in the direction of the arrows indicated along lines 9—9 of FIG. 2.

Referring now FIGS. 8 and 9, the fore and aft operation of mechanism 20 functions similarly to the vertical operation of mechanism 20. To facilitate the relative horizontal motion between plates 38 and 39, second working member fourth linear cylindrical members 100 and fifth linear cylindrical member 102 are received through and guided by bearing members, illustrated as spherical bushings 104, 106 and 108. Similar to first and second linear members 40 and 42, fourth and fifth linear members 100 and 102 are disposed generally parallel relative to one another and are bolted to working plate 38 at flanges 110,112 and 114,116 respectively. Unlike first and second linear members 100 and 102, however, fourth and fifth linear members 100 and 102 are skewed relative to plate 38. In particular, unlike first and second linear members 40 and 42 which define a plane parallel to working plate 38, fourth and fifth linear members 100 and 102 define a plane which is skewed relative to working plate 38.

Similar to bushings 44 and 46, spherical bushings 104 and 106 are bolted to second working member 39, while spherical bushing 108 is mounted horizontally-fixed relative to base plate 39 as discussed further hereinafter. As a result, fourth linear member 100 translates horizontally guided by spherical bushings 104 and 106. Similarly, fifth linear member 102 translates horizontally guided by spherical bushing 108.

Referring now to FIG. 9, spherical bushing 108 is mounted to a sixth cylindrical linear member 118 which is fixed in a horizontal direction relative to second working member 39, but is free to translate in a vertical direction relative to second working member 39. In the specific preferred embodiment, a cylindrical bushing 120 is mounted to second working member 39 and receives and guided sixth linear member 118 therethrough. As a result, sixth linear member 118 and spherical bushing 108 translate in a vertical direction to accommodate any spacing deviations between the fourth and fifth linear members 100 and 102.

The specific construction of the fifth, sixth, seventh and eighth bearing members identified as spherical bushings 104, 106, and 108 and of cylindrical bushing 120 is similar to the construction of corresponding spherical bushings 44, 46 and 48 of cylindrical bushing 60 described above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for use in translating motion between a pair of members, comprising:

a base member;

a first working member adapted for translation relative to said base member;

a first linear member attached to said first working member;

a second linear member attached to said first working member, said second linear member being disposed generally parallel to said first linear member;

a first bearing member attached to said base member, said first bearing member slidingly receiving said first linear member therethrough;

a second bearing member attached to said base member, said second bearing member slidingly receiving said first linear member therethrough;

a third bearing member attached to said base member;

a third linear member slidingly received through said third bearing member; and a fourth bearing member attached to said third linear member, said fourth bearing member slidingly receiving said second linear member therethrough.

2. The apparatus of claim 1, and further comprising:

a second working member adapted for translation relative to said first working member;

a fourth linear member attached to said first working member;

a fifth linear member attached to said first working member, said fifth linear member being disposed generally parallel to said fourth linear member;

a fifth bearing member attached to said second working member, said fifth bearing member slidingly receiving said fourth linear member therethrough;

a sixth bearing member attached to said second working member, said sixth bearing member slidingly receiving said fourth linear member therethrough;

a seventh bearing member attached to said second working member;

a sixth linear member slidingly received through said sixth bearing member; and an eighth bearing member attached to said sixth linear member, said eighth bearing member slidingly receiving said fifth linear member therethrough;

wherein said first, second and third linear members and said first, second, third and fourth bearing members translate said first working member in a first direction relative to said base member and said fourth, fifth and sixth linear members and said fifth, sixth, seventh and eighth bearing members translate said second working member in a second direction relative to said first working member.

3. An operator controlled adjustment apparatus for use in construction machinery, comprising:

a base member;

a first working member;

a second working member;

first and second shafts guidedly attached to said first working member for guided movement relative to said base member in a first direction;

a first bearing attached to said base member;

a third shaft guidedly received through said first bearing for movement in a second direction;

a second bearing attached to said third shaft, said second bearing guidedly receiving one of said first and second shafts therethrough;

fourth and fifth shafts guidedly attached to said first working member for movement in said second direction;

a third bearing attached to said second working member;

a sixth shaft guidedly received through said third bearing for movement in said second direction; and a fourth bearing attached to said sixth shaft, said fourth bearing guidedly receiving one of said fourth and fifth shafts therethrough.

4. The operator controlled adjustment apparatus of claim 3, wherein said first direction is perpendicular to said second direction.

* * * * *